United States Patent
Wang et al.

(10) Patent No.: US 8,255,402 B2
(45) Date of Patent: Aug. 28, 2012

(54) METHOD AND SYSTEM OF CLASSIFYING ONLINE DATA

(75) Inventors: Fang Wang, Suffolk (GB); Hakan Duman, Suffolk (GB); Simon G Thompson, Woodbridge (GB); Duong Nguyen, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 12/988,714

(22) PCT Filed: Apr. 23, 2009

(86) PCT No.: PCT/GB2009/001022
§ 371 (c)(1),
(2), (4) Date: Oct. 20, 2010

(87) PCT Pub. No.: WO2009/130455
PCT Pub. Date: Oct. 29, 2009

(65) Prior Publication Data
US 2011/0035377 A1    Feb. 10, 2011

(30) Foreign Application Priority Data
Apr. 23, 2008   (GB) .................................. 0807409.8

(51) Int. Cl.
*G06F 17/30* (2006.01)
(52) U.S. Cl. ..................................................... 707/737
(58) Field of Classification Search .................. 707/737
See application file for complete search history.

(56) References Cited

U.S. PATENT DOCUMENTS

| | | | |
|---|---|---|---|
| 5,857,179 A | 1/1999 | Vaithyanathan et al. | |
| 6,786,406 B1 | 9/2004 | Maningas | |
| 6,978,274 B1 | 12/2005 | Gallivan et al. | |
| 7,162,471 B1 * | 1/2007 | Knight et al. | 707/750 |
| 7,188,079 B2 | 3/2007 | Arnett et al. | |
| 7,203,704 B1 | 4/2007 | Stern et al. | |
| 7,487,094 B1 * | 2/2009 | Konig et al. | 704/270 |
| 7,590,603 B2 * | 9/2009 | Zhang et al. | 706/12 |
| 7,747,705 B1 | 6/2010 | Raja | |
| 2002/0120619 A1 | 8/2002 | Marso et al. | |
| 2003/0154072 A1 | 8/2003 | Young et al. | |
| 2004/0128357 A1 | 7/2004 | Giles et al. | |
| 2004/0172415 A1 * | 9/2004 | Messina et al. | 707/104.1 |
| 2005/0091038 A1 * | 4/2005 | Yi et al. | 704/10 |
| 2005/0137939 A1 * | 6/2005 | Calabria et al. | 705/26 |

(Continued)

FOREIGN PATENT DOCUMENTS
GB          2 365 576          2/2002
(Continued)

OTHER PUBLICATIONS

Sujit Pal, Document Classification using Naive Bayes, Apr. 2007, pp. 1-12.*

(Continued)

*Primary Examiner* — Jorge A Casanova
(74) *Attorney, Agent, or Firm* — Nixon & Vanderhye P.C.

(57) ABSTRACT

A method of automatically analyzing online posts, such that they may then be responded appropriately. The method may comprise: extracting a list of keywords from each of the plurality of posts; generating one or more keyword clusters based on the keywords extracted from each of the plurality of posts and classifying new posts in accordance with the one or more keyword clusters.

20 Claims, 5 Drawing Sheets

U.S. PATENT DOCUMENTS

| | | | |
|---|---|---|---|
| 2005/0210065 A1 | 9/2005 | Nigam et al. | |
| 2006/0004561 A1 | 1/2006 | Zhang et al. | |
| 2006/0026593 A1 | 2/2006 | Canning et al. | |
| 2006/0029106 A1 | 2/2006 | Ott et al. | |
| 2006/0080162 A1 | 4/2006 | Arnett et al. | |
| 2006/0089924 A1 | 4/2006 | Raskutti et al. | |
| 2006/0184464 A1* | 8/2006 | Tseng et al. | 706/14 |
| 2006/0233325 A1 | 10/2006 | Wu et al. | |
| 2006/0235934 A1 | 10/2006 | Wilson et al. | |
| 2006/0259481 A1 | 11/2006 | Handley | |
| 2006/0271564 A1 | 11/2006 | Muntz et al. | |
| 2006/0284873 A1 | 12/2006 | Forrest et al. | |
| 2007/0245035 A1 | 10/2007 | Rezaei et al. | |
| 2007/0250500 A1 | 10/2007 | Ismalon | |
| 2007/0280460 A1 | 12/2007 | Harris et al. | |
| 2007/0294281 A1 | 12/2007 | Ward et al. | |
| 2008/0065659 A1 | 3/2008 | Watanabe et al. | |
| 2008/0077574 A1 | 3/2008 | Gross | |
| 2008/0114755 A1 | 5/2008 | Wolters et al. | |
| 2008/0183697 A1* | 7/2008 | Narahara et al. | 707/5 |
| 2008/0201222 A1* | 8/2008 | Lahaix | 705/14 |
| 2008/0243607 A1 | 10/2008 | Rohan et al. | |
| 2009/0006085 A1 | 1/2009 | Horvitz et al. | |
| 2009/0171984 A1 | 7/2009 | Park et al. | |
| 2010/0070448 A1* | 3/2010 | Omoigui | 706/47 |
| 2010/0169237 A1 | 7/2010 | Howard et al. | |
| 2010/0312724 A1 | 12/2010 | Pinckney et al. | |

FOREIGN PATENT DOCUMENTS

| | | |
|---|---|---|
| JP | 2007233438 | 9/2007 |
| KR | 20050074058 | 7/2005 |
| WO | 2004/100130 | 11/2004 |
| WO | 2005/043416 | 5/2005 |
| WO | 2008/045792 | 4/2008 |

OTHER PUBLICATIONS

Gao, W., Wong, K. F., Xia, Y., and Xu, R., *Clique Percolation Method for Finding Naturally Cohesive and Overlapping Document Clusters*, Department of Systems Engineering and Engineering Management, The Chinese University of Hong Kong, Shatin, N.T., Hong Kong, China, Y. Matsumoto et al, (Eds.): ICCPOL 2006, LNAI 4285, pp. 97-108, 2006.

Gao, Wei and Wong, Kam-Fai, *Natural Document Clustering by Clique Percolation in Random Graphs*, Department of Systems Engineering and Engineering Management, The Chinese University of Hong Kong, Shatin, N.T., Hong Kong, H. T. Ng et al. (Eds.): AIRS 2006, LNCS 4182, pp. 119-131, 2006.

Erdelyi, Miklos and Abonyi, Janos, *Node Similarity-based Graph Clustering and Visualization*, Department of Process Engineering, University of Pannonia, Veszprem, Hungary, pp. 483-494 (date unknown).

Gregory, Steve, *An Algorithm to Find Overlapping Community Structure in Networks*, Department of Computer Science, University of Bristol, England, 12 pgs. (date unknown).

Ding, C. H. Q., He, X, Zha, H., Gu, M., and Simon, H. D., *A Min-max Cut Algorithm for Graph Partitioning and Data Clustering*, NERSC Division, Lawrence Berkeley National Laboratory, University of California, Berkeley, CA; Department of Computer Science and Engineering, Pennsylvania State University, University Park, PA; Department of Mathematics, University of California, Berkeley, CA, 2001, pp. 107-114.

Phuc, Do and Phung, Nguyen Thi Kim, *Using Naive Bayes Model and Natural Language Processing for Classifying Messages on Online Forum*, Faculty of Information System, University of Information Technology, VNU-HCM, HoChiMinh City, VietNam, 2007, pp. 247-252.

Hennig, Sascha and Wurst, Michael, *Incremental Clustering of Newsgroup Articles*, University of Dortmund, Department of Computer Science, Baroperstr. 301, 44221 Dortmund, Germany, 10 pgs. (date unknown).

Gonzalez, M. C., Herrmann, H. J., Kertesz, J. and Vicsek, T., *Community structure and ethnic preferences in school friendship networks*, Institute for Computational Physics, Universitat Stuttgart, Pfaffenwaldring 27, D-70569, Stuttgart, Germany; Departamento de Fisica, Universidade Federal do Ceara, 60451-970 Fortaleza, Brazil; IfB, HIF E12, ETH Honggerberg, CH-8093 Zurich, Switzerland; Institute of Physics, Budapest University of Technology and Economics, H-1111 Budafoki ut. 8., Budapest, Hungary; Department of Biological Phusics and Statistical Biological Physics Research Group of HAS, Eotvos Lorand University, H-1117, Pazmany P. Setany 1A, Budapest, Hungary; Feb. 12, 2007, pp. 1-16.

Office Action (17 pgs.) dated Sep. 8, 2011 issued in co-pending U.S. Appl. No. 12/988,738.

Nurcan Durak, Blog Profile using Text Categorization, Published Jan. 2008, pp. 1-2.

Varlamis, I., Vassalos, V. and Palaios, A., *Monitoring the evolution of interests in the blogosphere*, Computer Sciences Department, Athens University of Economics and Business, Greece, 6 pgs., (date unknown).

Zafarani, R., Jashki, M. A., Baghi, H., and Ghorbani, A. A., *A Novel Approach for Social Behavior Analysis of the Blogosphere*, Faculty of Computer Science, University of New Brunswick, Fredericton, NB, Canada, pp. 356-367, 2008.

Carlson, Beth A., *Unsupervised Topic Clustering of Switchboard Speech Messages*, Lincoln Laboratory, Massachusetts Institute of Technology, Lexington, MA, pp. 315-318, 1996.

International Search Report for PCT/GB2009/001053 mailed Aug. 3, 2009.

International Search Report for PCT/GB2009/001022, mailed Jul. 23, 2009.

Document Classification using Naive Bayes. Salmon Run Blog. Apr.

\* cited by examiner

METHOD AND SYSTEM OF CLASSIFYING ONLINE DATA

This application is the U.S. national phase of International Application No. PCT/GB2009/001022 filed 23 Apr. 2009, which designated the U.S. and claims priority to European Application No. 0807409.8, filed 23 Apr. 2008, the entire contents of each of which are hereby incorporated by reference.

BACKGROUND AND SUMMARY

The present invention relates to a method of classifying data and in particular to a method of classifying online user generated data.

Web-based forums provide a space for online users to share information and seek help from each other. Suppliers of products and services often provide forums to allow support staff to assist users. It is conventional to find the most similar or relevant information (based on posts in online forums) to respond to a user query or post. Typical user submissions to online forums are very complex and often contain multiple concepts. Thus, the information that has the highest overall similarity to a forum submission may not be the best or the only solution to answer a user's query. Also, it may not satisfy all of the potential angles of interests of the user. This means that conventional approaches may fail to deliver some important useful information, which may be interesting to a user but does not have a high overall similarity value.

According to a first aspect of the present invention there is provided a method of analysing a plurality of online posts, the method comprising the steps of: a) extracting a list of keywords from each of the plurality of posts; b) generating one or more keyword clusters based on the keywords extracted from each of the plurality of posts and c) classifying new posts in accordance with the one or more keyword clusters. The method may comprise the further step of: d) allocating a new post to a community in accordance with the result of step c). Also, the method may comprise the yet further step of: e) sending a message to one or more service agents, the one or more service agents being associated with the community to which the post is allocated in step d). Alternatively, or in addition, the method may comprise the further step of: f) sending a message to one or more users, the one or more users being associated with the community to which the post is allocated in step d).

Step a) may comprise the determination of a term frequency-inverse document frequency weighting for one or more potential keywords. The method may comprise the further step of i) forming one or more keyword associations based on the list of keywords extracted in step a), step i) being carried out after step a) and before step b). The keyword associations may be formed in accordance with the correlation of co-occurring keyword pairs. A clique percolation model is applied to determine one or more keyword clusters. In step c), a new post may be be classified as belonging to a keyword cluster if a similarity function exceeds a predetermined threshold. Preferably in step c) the similarity function is a cosine similarity function.

According to a second aspect of the present invention there is provided a tangible computer readable medium comprising computer executable code for performing any of the methods as described above.

According to a third aspect of the present invention there is provided an apparatus comprising a processing unit, volatile and/or non-volatile memory and one ore more data storage devices, the apparatus being configured, in use, to execute performing any of the methods as described above.

In the present invention users' multiple interests are acknowledged and useful information from different categories is searched in order to satisfy user requirements from every related aspect. The present invention proposes a novel approach to managing and organising online forums based on overlapping communities, a property which is increasingly recognised in several types of natural networks (see MM Luscombe et al "*Genomic analysis of regulatory network dynamics reveals large topological changes*", Nature, 431: 308-312, 2004 & S. Wuchty and E Almaas, "*Peeling the yeast protein network*", Proteomics, 5:444-449, 2005). Inspired by these natural systems, a forum is defined for the purpose of the present application as a complex network, in which all entities (keywords, posts and users) may belong to multiple categories underlined by the interactive relationships of the entities.

It is known to form communities on the web, for example for e-learning systems (e.g. S Seufert et al "*A reference model for online learning communities*", International Journal on E-Learning, January-March, 2002, pp. 43-55) or in distributed peer-to-peer systems (e.g. M Khambatti, et al, "*Structuring Peer-to-Peer Networks using Interest-Based Communities*", Databases, Information Systems, and Peer-to-Peer Computing: First International Workshop, DBISP2P, Berlin, Germany, pp. 48-63 2004). These approaches, however, have a common shortcoming: a component only belongs to a community which has the maximum similarity to the component. They did not take the multiple interests of users/resources into consideration so the resulting clustering was usually quite inaccurate with high noise.

F. Wang, "*Multi-interest communities and community-based recommendations*", 3rd International Conference on Web Information Systems and Technologies, 3-6 Mar., 2007, Barcelona, disclosed the use of multi-interest communities to cluster movie data for movie users. This method worked well on data sets, such as movies, which have clear and well defined genres, but may not be able to deal with unstructured, complex and noisy data such a those in an online forum.

The Invention proposed in this report extracts and processes essential features of resources (keywords of posts) by carefully analysing the resources (posts in forums). The keywords obtained are then used to construct a complex graph according to keyword correlations and accordingly overlapping clusters are identified by using the Clique Percolation Method. So this invention automatically generates communities based on the social properties of resources and needs no explicit or implicit constraints as to the number, size, shape or disjoint characteristics of target clusters, as those required by many other clustering methods.

The core keyword clusters formed then absorb relevant posts and users to constitute overlapping communities. Furthermore, the communities are extended to incorporate other pertinent entities (keywords, posts and users) so as to widen the coverage of communities in the forum. The formed overlapping communities provide the foundation to support various services on the forum, such as recommendation, alerting and profiling of customer agents.

BRIEF DESCRIPTION OF THE DRAWINGS

Embodiments of the present invention will now be described, by way of example only, with reference to the accompanying drawings in which.

DETAILED DESCRIPTION OF PRESENT EXAMPLE EMBODIMENTS

Figure 1:
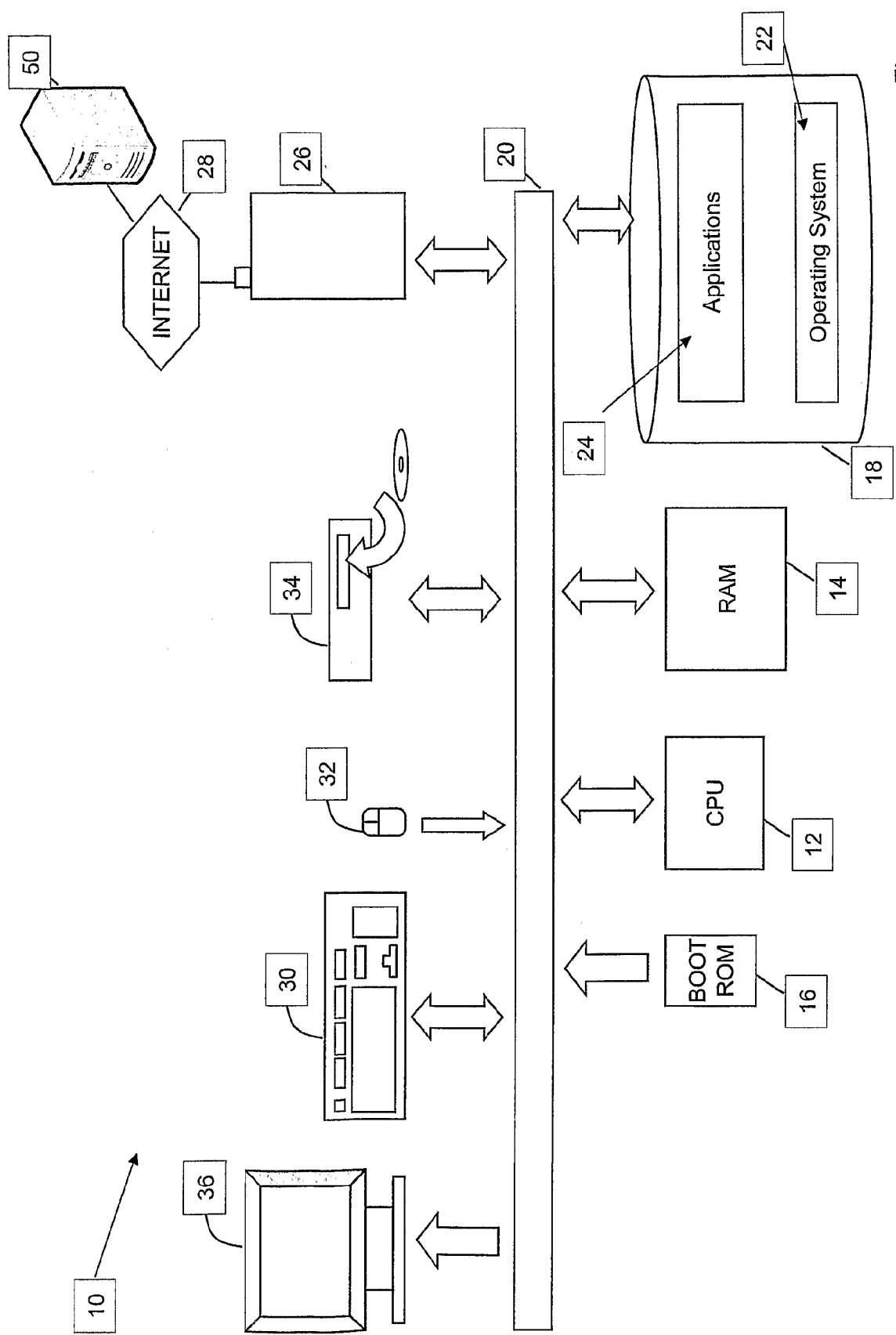
FIG. 1 shows a schematic depiction of a general purpose computing device.

FIG. 1 shows a schematic depiction of a general purpose computing device 10 which comprises well-known hardware components connected together in a conventional manner. The well-known hardware components comprise central processing unit (CPU) 12, random access memory (RAM) 14, read only memory (ROM) 16, one or more disk drives 18 and input/output devices 30, 32, 34 and 36. The hardware components are interconnected via one or more data and address buses 20. The input/output devices comprise a keyboard 30, a mouse 32, a CD-ROM (and/or DVD) drive 34 and a display 36. The disk drives store an operating system 22, which controls the operation of the computing device 10 when it is loaded into memory and executed. The disk drives also store one or more application programs 24 which can be loaded into memory and executed so as to provide additional functionality. The computing device 10 is connected to the internet 28 by a network interface 26 such that other computers and devices 50 may establish communication sessions with the computing device 10.

As is conventional, one of the application programs 24 executed by the computing device 10 may provide a forum within which a number of online users may leave comments, ask questions, seek for help, etc. It will be understood that the computing device 10 and online forums are both well known.

Figure 2:
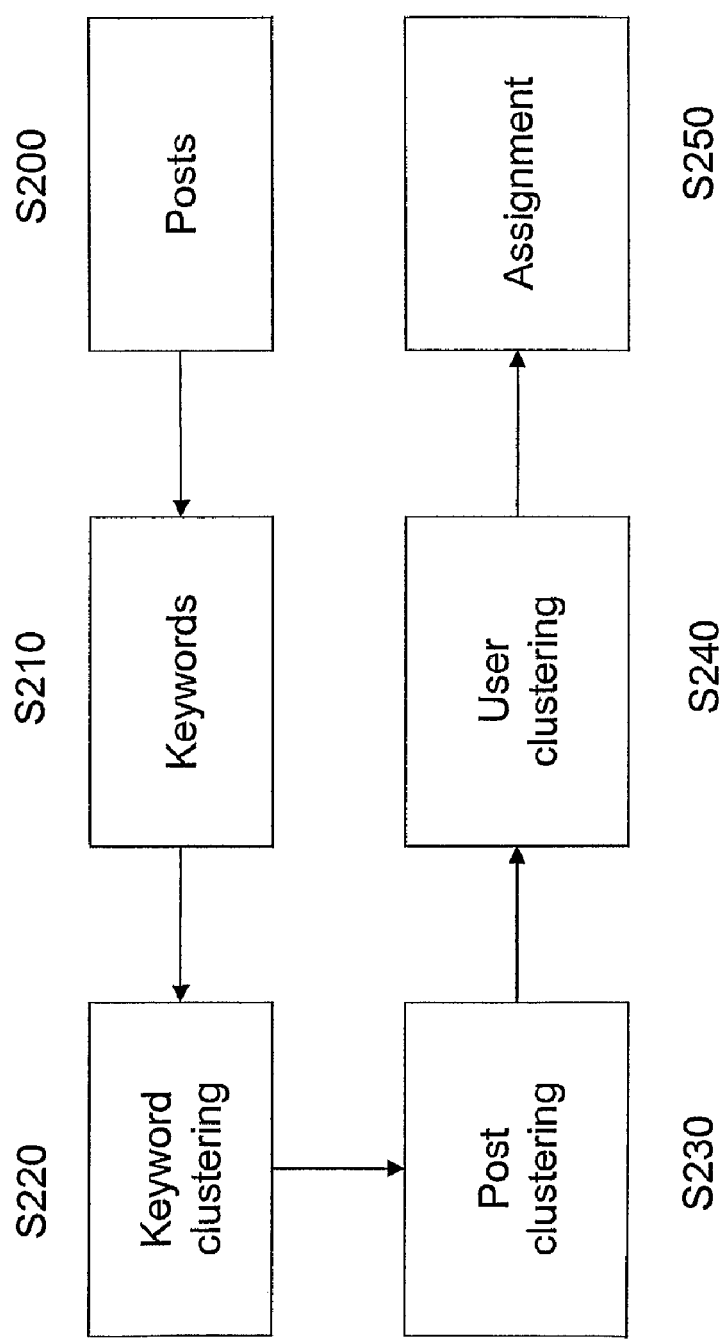
FIG. 2 shows a schematic depiction of a method according to the present invention.

FIG. 2 shows a schematic depiction of a method according to the present invention. At step S200 a number of posts from one or more forums are collected; at step S210 the plurality of posts are processed in order to construct a list of keywords; The list of keywords extracted in S210 is then used in S220 to construct keyword clusters; at step S230 post clusters are formed; at step S240 user clusters are formed and finally (at step S250) one or more posts are assigned to an agent for processing in accordance with one or more of the clusters formed in the preceding steps.

At step S210 the plurality of posts are processed in order to construct a list of keywords. There are a number of different techniques which can be used to construct a list of keywords, for example Porter's stemmer to stem words in the posts, TFIDF to count keyword frequency and inverse document frequency in the collection of posts. For the present invention, TFIDF was chosen.

The list of keywords extracted in S210 is then used to construct keyword association graphs, which are based on the inherent correlations of keywords. These keyword association graphs are then used in S220 to form one or more keyword clusters. There are in general three methods to estimate the concept-oriented semantic correlation between any two keywords: thesaurus based correlation, context based correlation and co-occurrence based correlation. The first method requires a manually constructed synonyms thesaurus, such as Wordnet in the English language, to identify the synset of terms. The second method suggests that the meaning of a keyword in a post should be reflected by its context, so a term is said to be near to another if their term distance is short enough in a local context. The final method is based on the assumption that high co-occurrence words are likely to be used together to describe a certain concept, so that it is reasonable to group them together to form a large semantic node. In the present invention, a co-occurrence based correlation method was used in which keyword associations were calculated, using the formula $$r_{ij} = \frac{f(t_i \wedge t_j)}{\max(f(t_i), f(t_j))} \quad [1]$$

where $f(t_i)$ denotes the number of posts which contain the term $t_i$, $f(t_i \wedge t_j)$ denotes the number of posts that contain both words $t_i$ and $t_j$; and max $(f(t_i), f(t_j))$ is the greatest value of either $f(t_i)$ or $f(t_j)$.

Equation [1] is applied to all pairings of keywords that appear together in a post and $r_{ij}$ indicates the weight of the connection between keywords i and j. All connections of the pairing keywords can be used to construct a keyword graph, which can then be used to discover keyword clusters. Generally speaking, a keyword cluster is a group of keywords that have strong correlations among them.

There are a number of approaches in graph partition to locate separated groups of nodes, however, only a few algorithms have capacity to find out overlapping modules, among which Clique Percolation Method (CPM) has been applied for uncovering community structure of co-authorship networks, protein networks and word association graphs. The basic idea of CPM is that natural and social systems are not fully connected networks because they are inherently noisy, so a few missing links should be allowed. In CPM, modules are k-clique percolation clusters which are maximal k-clique-connected subgraphs, i.e., the unions of all k-cliques that are k-clique connected to a particular k-clique. This naturally allows overlaps between modules because one node can participate in several k-clique percolation clusters.

Based on keyword clusters generated above, relevant posts and their users are attracted to the clusters if they have enough similarity to the groups of keywords. The similarity of a post to a keyword cluster can be calculated in many ways, in which cosine is the most often used one:

$$\cos(c_x, p_y) = \frac{\sum_i w_{xu} \cdot w_{yi}}{\sqrt{\sum_i w_{xi}^2 \cdot \sum_i w_{yi}^2}} \quad [2]$$

In step S230, a post $p_y$ joins a keyword cluster $c_x$ if the cosine similarity $\cos(c_x, p_y)$ is larger than a threshold $\epsilon$. Similarly, in step S240 a user $U_y$ joins a keyword cluster $c_x$ if the cosine similarity $\cos(c_x, U_y)$ is larger than a threshold s.

Accordingly a community is formed by integrating all relevant keywords, posts and users of the posts. While users write posts that are composed of keywords, keyword correlations produce core clusters that accordingly create relevant post and user clusters. These resulting clusters can then be used in the assignment of a post to a service agent such that, for example, a question in a post supplied by a first user can be answered by directing the user to a further post supplied by a second user. Posts relating to a particular topic and/or nature can be directed to a service agent who has the skills and experience to be able to process them in an appropriate manner.

It was found that CPM is still a very strict method when forming overlapping clusters because it requires a node at least connects other k−1 nodes in the clusters and all k-cliques are adjacent to each other. This condition allows the very similar or relevant posts to join in the relevant clusters but some less relevant posts may belong to nowhere.

Figure 3:
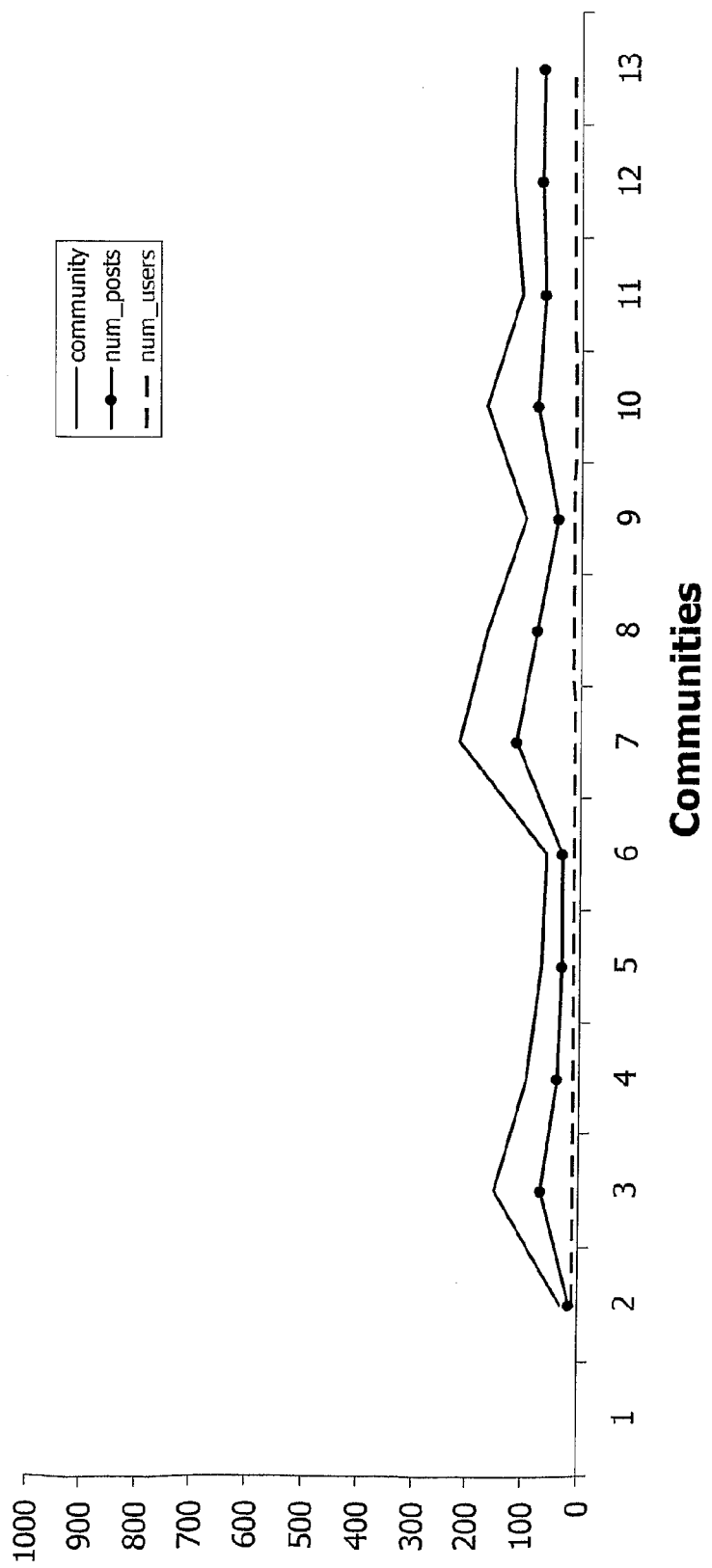
FIG. 3 shows a graphical depiction of applying CPM to communities.

Data was extracted from the Hubbub forum (http://hubbub.labs.bt.com/) which is an online forum for users interested in BT Softphone. The Hubbub forum is managed in a conventional manner, with a few human helpers assisting in investigating the posts in the forum and answering un-answered queries when necessary. The membership of the group of helpers is not fixed and new helpers may join in at any time. The forum administrator defines categories of help and allocates new helpers to suitable categories by hand. As there are now more than 40,000 posts in the forum with varied questions and topics, it is a significant challenge to manually organise the helpers in a reasonable way. 2500 posts of 683 users in the forum were extracted and processed in accordance with the method described above. When CPM was applied to these 2500 posts then nearly ⅓ of the tested 2500 posts did not fit into any community. FIG. 3 shows a graphical depiction of applying CPM to communities in this manner.

Figure 4:
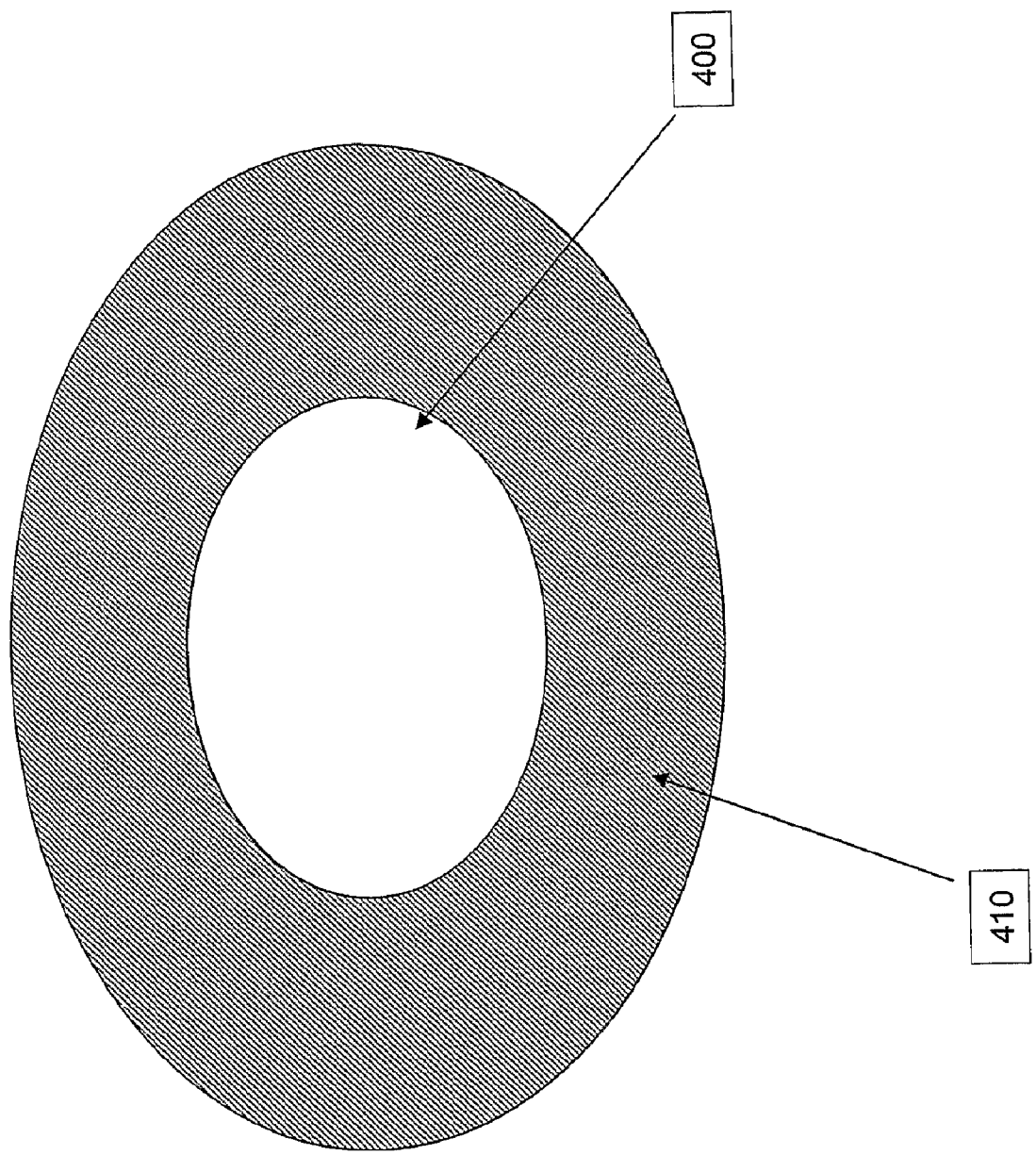
FIG. 4 shows a schematic depiction of extended communities.

To solve this problem, a community was extended to include words that have direct connections to the keywords of the community. The include words that may not form an adjacent k-clique in the community but they are all co-occurred with the core keywords of the community with enough correlation (i.e. where the cosine similarity value is above $\epsilon_2$). To distinguish, the keywords that are core to the formation of communities are called 'candidates' and all the other words together with candidates are called 'nodes'. The extended communities therefore include posts that have enough similarity to the nodes of a community, not just their candidates. FIG. 4 shows a schematic depiction of an extended community in which the candidates 400 are 'surrounded' by the extended keywords and resources 410.

Figure 5:
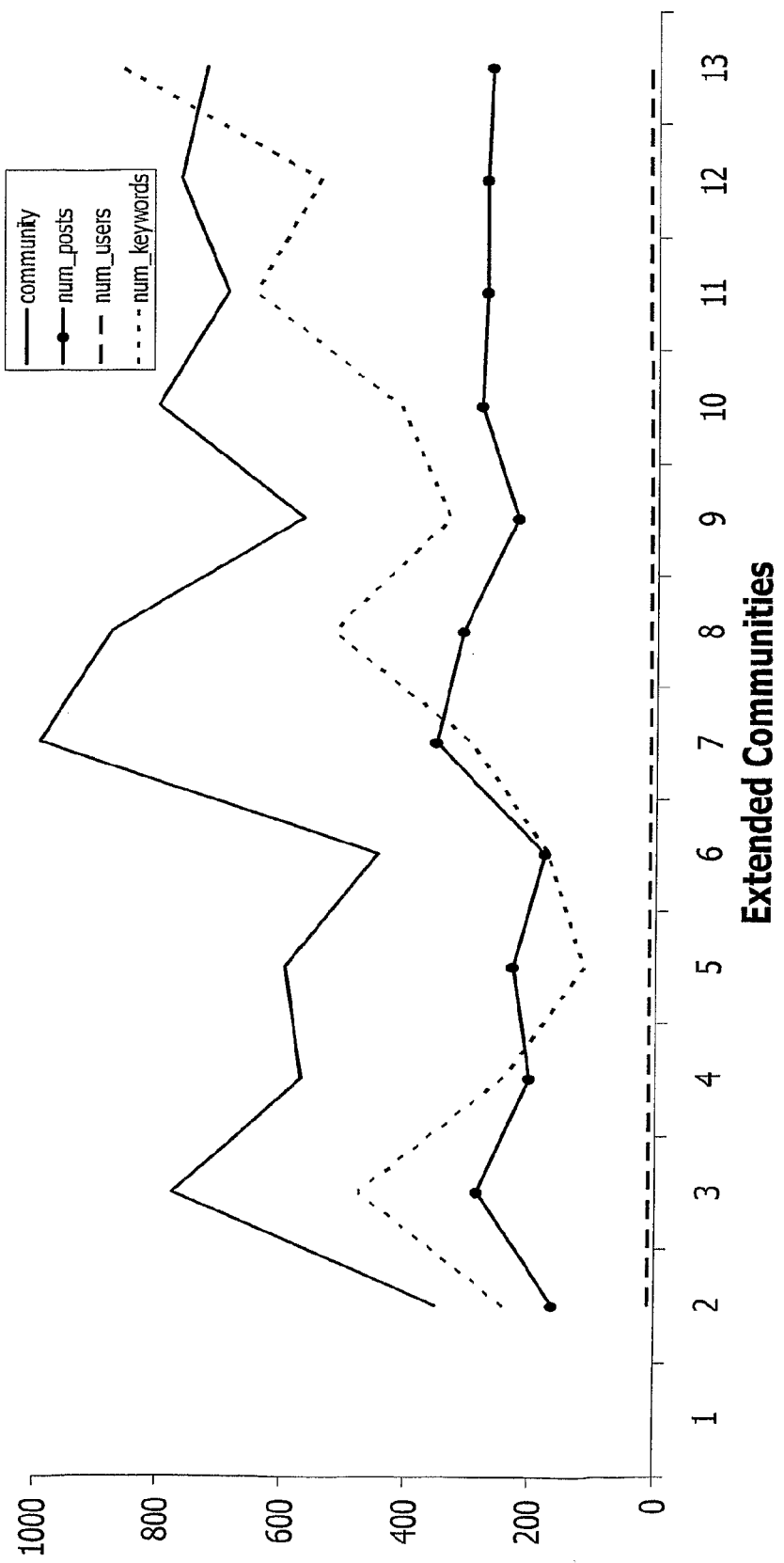
FIG. 5 shows a graphical depiction of applying CPM to extended communities.

2500 posts, from 683 users, were extracted from the Hubbub forum (the same data set as discussed above with reference to FIG. 3) and were used to generate 6336 keywords and 12 communities were created accordingly. FIG. 5 shows a graphical depiction of applying CPM to extended communities which shows that the size of the communities formed is much greater than for the non-extended communities.

By analysing the posts and their co-occurred keywords, the extended communities generated in this invention provide a good suggestion to recommend categories for helpers to choose. Table 1 below gives an attempt to summarise the possible topics of the communities from their candidates and the most often read posts. More accurate topics can be inferred by reading into more details (e.g., posts) of the communities.

TABLE 1

List of defined Communities

| Community | Possible Topics (Candidates) |
|---|---|
| 0 | Battery, charging-(posting, charging, battery, breach, consumer, trading, laws, organisation, dragging, feet, bearing,) |
| 1 | Video calls-(picture, upsidedown, 100, camera\'s, greyed-out, cosequently, horizontal/vertical, video, webcam, camera) |
| 2 | Video calls + call charges-(payg, subscribe, softphones, merge, locations, videophone, geographic, dupped, indicated, skypein, video) |

TABLE 1-continued

List of defined Communities

| Community | Possible Topics (Candidates) |
|---|---|
| 3 | Video chat + BT softphones-(btsoftphone, bought, behalf, videophone, dupped, oz, softphone . . . after, hype, landline . . . anyone, this . . . seems, video, ) |
| 4 | Cost-(5, evenings, weekends, costs, landlines, ntl, determined, supplies, telewest, 5p, refer, ) |
| 5 | Caller display, registration, configuration-(register, handset, pin, association, flash, 0, ready, display, registering, registration, mode, ) |
| 6 | Sound-(card, mac, os, apple, runs, knowledge, parallels, bridge, handset, media, headset, audio, ) |
| 7 | Firewal settings-(answered, ie7, ie6, closing, add-on, sneaked, ie/tools/manage, add-ons, sombody, disable) |
| 8 | Text, sms, router-(provide, turns, controls, beta, browsers, image, apparently, safari, submit, ignore, text) |
| 9 | Failure, problems-(secure, fails, firewalls, wi-fi, cd, channel, physical, networking, bother, word, green, save, mode, ) |
| 10 | Parental control-(posting, parental, controls, relating, beta, locked, wds, menus, dyndns, love, cookies, contacts, quiet, cleared) |
| 11 | Secure, Norton, linux-(secure, norton, hard, os, knowledge, installation, linux, platform, latest, compatibility, route, browsing, guid, practice,) |

When a new post is submitted to a forum, the post can be examined to see which communities it may belong to. These communities also indicate the possible interest topics the new post may be related with. Accordingly, the user of the new post will be recommended with the useful information in relevant communities, which may interest the user. The useful information of a community could be the most popular posts in the community, the posts with the highest weights (i.e., posts that have highest relevance to the community topic), the most similar posts in the community to the new post, etc.

Table 2 shows an example of the recommendations made by the present invention and those provided by the current Hubbub forum. From the results we can see that the information recommended by extended communities is more relevant than those automatically generated by the forum.

TABLE 2

Example of recommendations made by the present invention and by Hubbub

| Post 39511 | Should my phone still be charging after 36 hours? I plugged my new hub phone in on Saturday afternoon and it is still charging on Monday morning. |
|---|---|
| Recommended Community | 0 (posting, charging, battery, breach, consumer, trading, laws, organisation, dragging, feet, bearing) |
| Recommendations of Hubbub | 1. no dial tone no dial tone<br>2. 2. I can not get my BT Hub Phone 1010 to register to the BT Hub I can not get my BT Hub Phone 1010 to register to the BT Hub<br>3. Caller ID on Hubphone doesn't work I never see caller Id on the hubphone. The land line phone does display it.<br>4. Can't make or recieve calls Why has my broadband talk phone stopped working.<br>5. phone not working my broadband talk phone doesn't work<br>6. Broadband talk problem I can't make a call using broadband talk. I get a dialing tone and the hub phone is all set up and configured, but when I dial a number it doesn't ring, I just get a continuous tone. When I ring the Broadband talk number I just get a 1571 message saying the person is unavailable. Is any one else having this problem? The BT help desk both on line and over the phone have been useless.<br>7. Unable to make outgoing calls on BT Broadband Talk Unable to make outgoing calls on BT Broadband Talk. The phone LED is lit on the Home Hub and we can receive calls on the Broiadband Talk number, but when we dial |

TABLE 2-continued

Example of recommendations made by
the present invention and by Hubbub out you can hear the phone dialling the number and then a few clicks and then a monotone buzz!!! Nothing. Anyone out there with a similar experience and if so, what is the solution! Also I have tried the softphone and that says service is unavailable even though BT have assured me that the service is running (I am already on my second Home Hub and the problem is the same with a DECT phone and a old style cord phone). Many thanks.
8. registration how do i register for the bt broadband talk service
9. Cannot configure BT Broadband Talk Online Cannot configure BT Broadband Talk Online
10. Caller Display How do I activate caller display on my hub phone?

When a new post is submitted into the forum, it may be sent to relevant users to alert them of new useful information. Again, the new post can be clustered into relevant communities and the users of all relevant communities may receive the alert. Furthermore, or as an alternative, such alerts may be sent to service agents who are allocated to or are associated with the relevant communities such that they have visibility of the new posts. Dependent upon the type of subject matter of the posts then it may be advantageous for the service agents to be supplied with the alerts before they are forwarded to users. Table 3 below shows such an example, where users of community 6, 5 and 0 will be informed of the new coming post regards battery charging.

TABLE 3

Example of a new post being made available to all relevant communities

| | |
|---|---|
| Post 39533 | Should my phone still be charging after 36 hours? Many people have reported that their phones always display a slight charge even when fully charged, mine also and it does not seem a problem. When first charged (3 or 4 hours) the display runs fully across the battery then only slightly at the L/H side, this seems to be normal. |
| Community | 6 (card, mac, os, apple, runs, knowledge, parallels, bridge, handset, media, headset, audio, )
5 (register, handset, pin, association, flash, 0, ready, display, registering, registration, mode, )
0 (posting, charging, battery, breach, consumer, trading, laws, organisation, dragging, feet, bearing, ) |

It will be understood that the invention may be implemented using software that is run on one or more computers. It will be understood that such software may be deployed via download, for example via the internet, or on some physical media, for example, DVD, CD-ROM, USB memory stick.

What is claimed is:

1. A system for forming an online community comprising a processing unit, volatile and/or non-volatile memory and one or more data storage devices, the processing being configured to:
   (a) extract a plurality of keywords from a plurality of posts;
   (b) generate one or more keyword clusters based on the plurality of keywords extracted from the plurality of posts, each of the one or more keyword clusters comprising a plurality of keywords;
   (c) classify new posts in accordance with the one or more keyword clusters,
   (d) allocate a new post to one or more communities in accordance with the result of classifying in (c); and
   (e) allocate a user to one or more communities in accordance with the classification of the posts they create;
   wherein each community comprises a keyword cluster which comprises a plurality of core keywords and one or more node keywords, the core keywords having an association with each other which exceeds a first threshold value, the one or more node keywords having an association with each other which exceeds a second threshold value, wherein the first threshold value is greater than the second threshold value.

2. A system according to claim 1, the processing unit is further ocnfigured to:
   (e) send a message to one or more service agents, the one or more service agents being associated with the community to which the post is allocated in (d).

3. A system according to claim 1, the processing unit is further configured to:
   (e) send a message to one or more users, the one or more users being associated with the community to which the post is allocated in (d).

4. A system according to claim 1, wherein the extraction in (a) comprises determination of a term frequency-inverse document frequency weighting for one or more potential keywords.

5. A system according to claim 1, wherein processing unit is further configured to:
   (e) form one or more keyword associations based on the list of keywords extracted in (a), said in (e) being carried out after the extraction (a) and before the generation of the one or more keyword clusters in (b).

6. A system according to claim 5, wherein the keyword associations are formed in accordance with the correlation of co-occurring keyword pairs.

7. A system according to claim 1, wherein a clique percolation model is applied to determine one or more keyword clusters.

8. A non-transitory computer readable storage medium comprising computer executable code which upon execution by a computer performs operation comprising:
   extracting a plurality of keywords from a plurality of posts;
   generating one or more keyword clusters based on the the plurality of keywords extracted from the plurality of posts, each of the one or more keyword clusters comprising a plurality of keywords;
   classifying in new posts in accordance with the one or more keyword clusters;
   allocating a new post to one or more communities in accordance with the result of said classifying new posts; and
   allocating a user to one or more communities in accordance with the classification of the posts they create;
   wherein each community comprises a keyword cluster which comprises a plurality of core keywords and one or more node keywords, the core keywords having an association with each other which exceeds a first threshold value, the one or more node keywords having an association with each he which exceeds a second threshold value, wherein the first threshold value is greater than the second threshold value.

9. The storage medium according to claim 8, the operation further comprises:
   sending a message to one or more service agents, the one or more service agents being associated with the community to which the post is allocated in said allocating the new post.

10. The storage medium according to claim 8, the operation further comprises:
    sending a message to one or more users, the one or more users being associated with the community to which the post is allocated in said allocating the new post.

11. The storage medium according to claim 8, wherein said extracting comprises determining a term frequency-inverse document frequency weighting for one or more potential keywords.

12. The storage medium according to claim 8, wherein the operation further comprises forming one or more keyword associations based on the list of keywords extracted in said extracting, said forming being performed after said extracting and before said generating.

13. The storage medium according to claim 12, wherein the keyword associations are formed in accordance with the correlation of co-occurring keyword pairs.

14. The storage medium according to claim 8, wherein a clique percolation model is applied to determine one or more keyword clusters.

15. A method comprising:
    extracting, using a processing unit having at least one computer processor, a plurality of keywords from a plurality of posts;
    generating one or more keyword clusters based on the plurality of keywords extracted from the plurality of posts, each of the one or more keyword clusters comprising a plurality of keywords;
    classifying new posts in accordance with the one or more keyword clusters;
    allocating a new post to one or more communities in accordance with the result of said classifying new posts; and
    allocating a user to one more communities in accordance with the classification of the posts they create;
    wherein each community comprises a keyword cluster which comprises a plurality of core keywords and one or more node keywords, the core keywords having an association with each other which exceeds a first threshold value, the one or more node keywords having an association with each other which exceeds a second threshold value, wherein the first threshold value is greater than the second threshold value.

16. The method according to claim 15, the method further comprises:
    sending a message to one or more service agents or one or more users, the one or more service agents or the one or more users being associated with the community to which the post allocated in said allocating the new post.

17. The method according to claim 15, wherein said extracting comprises determining a term frequency-inverse document frequency weighting for one or more potential keywords.

18. The method according to claim 15, wherein the method further comprises forming one or more keyword associations based on the list of keywords extracted in said extracting, said forming being performed after said extracting and before said generating.

19. The method according to claim 18, wherein the keyword associations are formed in accordance with the correlation of co-occurring keyword pairs.

20. The method according to claim 15, wherein a clique percolation model is applied to determine one or more keyword clusters.

* * * * *